US012619996B2

(12) United States Patent
      Fischbach

(10) Patent No.: US 12,619,996 B2
(45) Date of Patent: May 5, 2026

(54) ANTI-COUNTERFEIT CONTAINER

(71) Applicant: N.V. Nutricia, Zoetermeer (NL)

(72) Inventor: Elmar Martin Fischbach, Utrecht (NL)

( * ) Notice: Subject to any disclaimer, the term of this patent is extended or adjusted under 35 U.S.C. 154(b) by 1250 days.

(21) Appl. No.: 16/446,058

(22) Filed: Jun. 19, 2019

(65) Prior Publication Data

US 2019/0303949 A1      Oct. 3, 2019

Related U.S. Application Data

(63) Continuation of application No. PCT/NL2017/050851, filed on Dec. 19, 2017.

(30) Foreign Application Priority Data

Dec. 20, 2016    (WO) ............... PCT/NL2016/050898

(51) Int. Cl.
      *G06Q 30/00*      (2023.01)
      *B65D 5/42*       (2006.01)
      *B65D 51/20*      (2006.01)
      *B65D 55/08*      (2006.01)
      *B65D 75/58*      (2006.01)
      *G06Q 30/018*     (2023.01)

(52) U.S. Cl.
      CPC ......... *G06Q 30/018* (2013.01); *B65D 5/4212* (2013.01); *B65D 51/20* (2013.01); *B65D 55/0818* (2013.01); *B65D 75/5855* (2013.01); *B65D 2203/00* (2013.01); *B65D 2203/06* (2013.01); *B65D 2401/05* (2020.05)

(58) Field of Classification Search
      CPC .... G06Q 30/018; B65D 5/4212; B65D 51/20; B65D 55/0818; B65D 75/5855; B65D 2401/05; B65D 2203/00; B65D 2203/06

USPC ...................................................... 206/459.5
See application file for complete search history.

(56) References Cited

U.S. PATENT DOCUMENTS

| | | | |
|---|---|---|---|
| 6,446,794 B1 | 9/2002 | Hacikyan | |
| 6,880,313 B1 * | 4/2005 | Gessford | B65D 71/08 |
| | | | 53/442 |
| 2003/0124471 A1 * | 7/2003 | Ishii | G03C 3/00 |
| | | | 430/496 |

(Continued)

FOREIGN PATENT DOCUMENTS

| | | |
|---|---|---|
| CN | 101984458 A | 3/2011 |
| CN | 202098664 U | 1/2012 |

(Continued)

OTHER PUBLICATIONS

International Search Report mailed Mar. 1, 2018 for International Patent Application No. PCT/NL2017/050851 filed Dec. 19, 2017. 5 pages.

*Primary Examiner* — Andrew D Perreault
(74) *Attorney, Agent, or Firm* — Ipsilon USA—NLO

(57)                ABSTRACT

The invention provides a container for infant formula food with anti-counterfeit measures. In order to prevent counterfeiting, the container comprises a cover for closing the container. An outer scannable code is provided on the container so as to be scannable from the outside. Inside the container, a gas-tight membrane seal for sealing a food content of the container prior to use is provided. On the gas-tight membrane seal, an inner scannable code is provided so as to be only scannable after opening the container.

15 Claims, 6 Drawing Sheets

(56)        References Cited

U.S. PATENT DOCUMENTS

2016/0027021  A1      1/2016  Keremelidis
2017/0323588  A1*   11/2017  Marchesano  ......... G09F 3/0292

FOREIGN PATENT DOCUMENTS

| CN | 203520422 | U  | 4/2014 |
| CN | 103824202 | A  | 5/2014 |
| CN | 204606509 | U  | 9/2015 |
| CN | 205281545 | U  | 6/2016 |
| GB | 2506429 | A  | 4/2014 |
| GB | 201217468 | A  | 4/2014 |
| WO | WO2013/125941 | A1 | 8/2013 |
| WO | WO2014/072455 | A2 | 5/2014 |
| WO | WO2014/084721 | A1 | 6/2014 |
| WO | WO2016/148587 | A1 | 9/2016 |

* cited by examiner

ANTI-COUNTERFEIT CONTAINER

CROSS-REFERENCE TO RELATED PATENT APPLICATIONS

This application is a continuation of International Patent Application No. PCT/NL2017/050851, filed Dec. 19, 2017, which claims the benefit of and priority to International Patent Application No. PCT/NL2016/050898, filed Dec. 20, 2016. The entire disclosure of each application is incorporated by reference herein.

FIELD OF THE INVENTION

The present invention relates to a container for food, especially for infant formula food, and more especially an anti-counterfeit container for infant formula food.

BACKGROUND ART

Food products to be sold need to be stored in packages that provide the necessary preservation conditions. The authenticity of the products is of utmost importance, so that the products that reach the consumers are not counterfeited.

Different authentication techniques are known in the art, such as anti-tampering means placed on the outside of the package and that need to be broken in order to open the package, and codes that are placed outside the package and that can be scanned to receive information about the product.

However, the anti-tampering means could be imitated and provided again in a product already opened and refilled with a different product from the original, and even if codes are used, these could be copied and used in another packaging. These are mere examples of different ways in which it would be possible to counterfeit products.

Such counterfeiting risks are daily faced by the food industry. These counterfeit actions can be date code fraud, label replacement, packaging reuse or content replacement, and imitation, among others. There are in the art authentication mechanisms that are quite successful in avoiding counterfeiting and in providing a good safety level in a cost-effective manner. Still, human ingenuity might make it possible to breach these safety measures.

There is therefore a need to provide cost-effective authentication and anti-counterfeit features to food containers that minimize the risk of fraud and that therefore further improve safety of the products that reach the consumers.

SUMMARY OF THE INVENTION

It is an object of the present invention to provide improved authentication and anti-counterfeit features to food containers, preferably to infant formula food containers.

According to the present invention, a container for food such as infant food is provided, comprising a cover for closing the container; an outer scannable code provided on the container so as to be scannable from the outside (e.g. without opening the cover or unfastening any tamper-proof closure means); a gas-tight membrane seal inside the container for sealing a food content of the container prior to use; and an inner scannable code provided on the membrane seal so as to be only scannable after opening the container.

This container provides an improved authentication mechanism, because its layered approach consists of an outer scannable code placed on the outer surface of the container, and an inner code placed inside the container on a gas-tight membrane seal that protects the product. This structure adds extra security levels because the inner scannable code and the gas-tight membrane seal on which it is placed are difficult to counterfeit.

In an embodiment of the invention, the gas-tight membrane seal comprises a tear strip configured to be torn along a tear path and to leave a part of the membrane seal in the container. This opening mechanism leaves a part of the membrane seal in the container, and the membrane seal is therefore not completely removed when opened, which is advantageous because once it has been opened it is extremely difficult to remove the rest and replace it with a new one without this being noticeable.

In an embodiment of the invention, the gas-tight membrane seal comprises a plastic, metal or plastics-metal foil.

In an embodiment of the invention, the gas-tight membrane seal is attached to the container by ultrasonic welding. In an embodiment of the invention, the gas-tight membrane seal is attached to the container by induction sealing. These sealing mechanisms have the advantage of not requiring glue, which is preferred when working with infant formula food.

In an embodiment of the invention, the gas-tight membrane seal has a surface area of at least 50 square centimetres, or even at least 100 square centimetres.

In an embodiment of the invention, the inner scannable code is preferably located on the outer side of the membrane seal facing away from the container content.

In a further embodiment of the invention, the inner scannable code is placed on the membrane seal outside of the tear path.

In an embodiment of the invention, the inner scannable code is a laser marked visible code on the membrane seal. In an embodiment of the invention, the outer scannable code is a laser marked visible code on the outer surface of the container. Laser marking has an advantage over other marking techniques such as inkjet, which can be erased, in that the laser beam removes the top layer of the container material and it cannot be changed easily. In an alternative embodiment wherein inkjet printing is used, the scannable inkjet code is covered by a transparent finishing layer to protect the inkjet marking from being erased.

In an embodiment of the invention, the inner scannable code is placed on the gas-tight membrane seal outside of the tear path. In particular, the inner scannable code may be provided on a part of the gas-tight membrane seal on a side of the tear path opposite a container edge, so that the inner scannable code is on a part of the gas-tight membrane seal that will be removed when the container is opened.

In an embodiment of the invention, the inner and outer scannable codes are associated with each other. For example, a database may store that the two codes as belonging together. This ensures that the outer code indeed relates to the same product that is placed within the membrane seal in which the inner code is located.

In an embodiment of the invention, the inner and/or the outer scannable code is a QR code.

In an embodiment of the invention, each specific inner scannable code is a unique code. That is, only one container is produced wherein the specific inner scannable code is used.

In an embodiment, each specific outer scannable code is a unique code. Alternatively, it is also possible that the outer scannable code is a general, non-unique code, which is used on more than one produced container. If both the inner scannable and the outer scannable codes are unique, then the association between inner and outer scannable code will be one-to-one. That is, one specific inner scannable code will be associated with one specific outer scannable code. If the outer scannable code is not unique, then the outer-to-inner scannable code association will be one-to-many, respectively. That is, one specific outer scannable code is associated with a plurality of specific inner scannable codes.

BRIEF DESCRIPTION OF THE DRAWINGS

The present invention will be discussed in more detail below, with reference to the attached drawings, in which.

DESCRIPTION OF EMBODIMENTS

Figure 1:
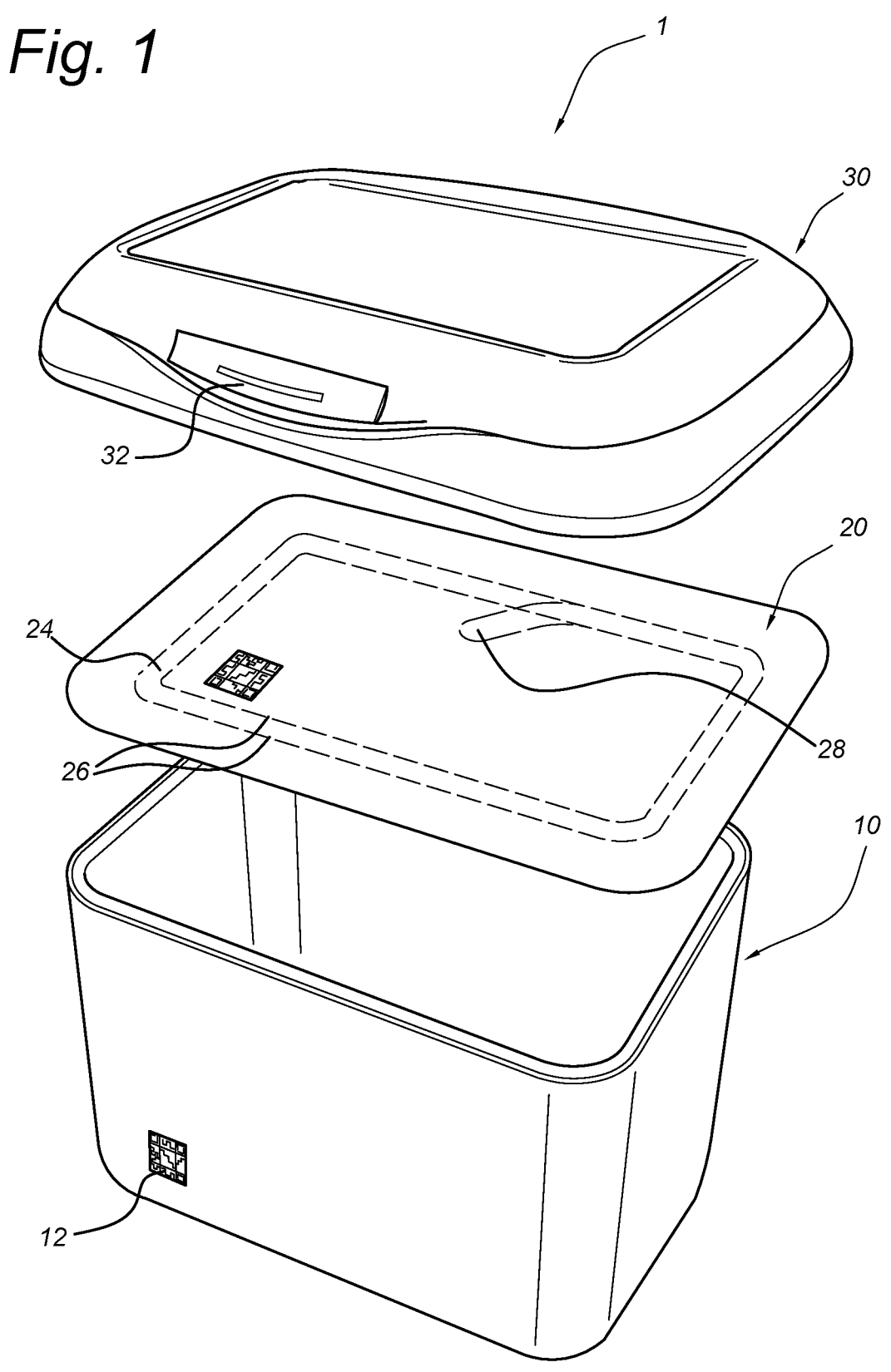
FIG. 1 depicts an overview of a container according to an embodiment of the present invention in which the different parts constituting the container are separately visible.

FIG. 1 depicts an overview of a container according to the present invention in which the different parts constituting the container are separately visible.

A container 1 according to the present invention comprises a container body 10 in which food, preferably infant formula food, is to be placed. The container further comprises a lid or cover 30 that is configured to close the container and protect the food content. The cover 30 may comprise a closure means 32 that allows the cover to be opened and closed so that the container can then be closed for a future use and the food can therefore be protected. The cover 30 may according to an embodiment of the invention further comprise a tamper-proof closure means 34 (not shown in this figure) to further secure the closure means 32, so that the closure means, or cover 30 itself, can only be opened for the first time after breaking or altering the tamper-proof closure means 34. If a consumer who is to open the cover for the first time sees that the tamper-proof closure means 34 is not intact, it is a sign that the product might have already been opened and that it might not be authentic. The tamper-proof closure means 34 may be a plastic shrink sleeve wrapped around the cover 30, so that the opening part of the cover as well as the frame below it can both be covered, and optionally the container body 10, or one or multiple stickers covering the opening part of the cover 30 so that they leave evidence behind once they have been tampered with.

The container may further comprise a membrane seal 20, which is preferably a gas-tight membrane seal, located under the cover 30 and which covers the food containing space, sealing the product prior to use. The membrane seal 20 is preferably attached to the container by mechanisms that do not require glue, which is of preferable in a container suitable for infant formula food. The membrane seal 20 may be attached to the container using ultrasonic welding or induction sealing, or any other mechanism if gluing is not desired or that is appropriate for infant formula food containers. The membrane seal 20 may be made of a material that makes it suitable for protecting food content and that also allows it to be attached to the container. The membrane seal 20 may comprise a plastic, metal or plastics-metal foil.

In order to access the food inside the container, the membrane seal 20 needs to be opened. In an embodiment of the invention, the membrane seal 20 may have a tear strip 24 configured to be torn along a tear path 26 and to leave a part of the membrane seal 20 in the container. With this opening mechanism, a part of the membrane seal 20 is left in the container when the tear strip 24 is torn, and the membrane seal 20 is therefore not completely removed when opened, which has the advantage that once the membrane seal 20 has been opened it is extremely difficult to remove the rest and replace it with a new one without this being noticeable.

The tear strip 24 may comprise a pull tab 28 that allows a consumer to easily pull the tear strip 24 to open the membrane seal 20.

The container according to an embodiment of the present invention additionally comprises at least two scannable codes. In an embodiment of the invention, an outer scannable code 12 may be provided on the container so as to be scannable from the outside, so without opening the closure means 32 and without unfastening the tamper-proof closure means 34 (if present). This outer scannable code 12 may be placed on the outer part of the container body 10 or on the outer part of the cover 30, or on the outer surface of an outer box containing the container. The outer scannable code can be unique (e.g. used only on one container) or it can be used on a plurality of containers of the same type, or for a plurality of containers with the same content composition, the same batch number, the same expiration date, or other shared properties.

An inner scannable code 22 is furthermore provided on the membrane seal 20 so as to be only scannable after opening the cover 30 through the closure means 32, and after breaking or altering the tamper-proof closure means 34 (if present). The inner scannable code 22 is therefore configured to be scanned only when the cover 30 has been opened. The inner scannable code may be unique (i.e. used only in one container).

The outer scannable code 12 and the inner scannable code 22 may be associated with each other. A more detailed explanation of the scannable codes will be explained in connection with the next figures.

Figure 2:
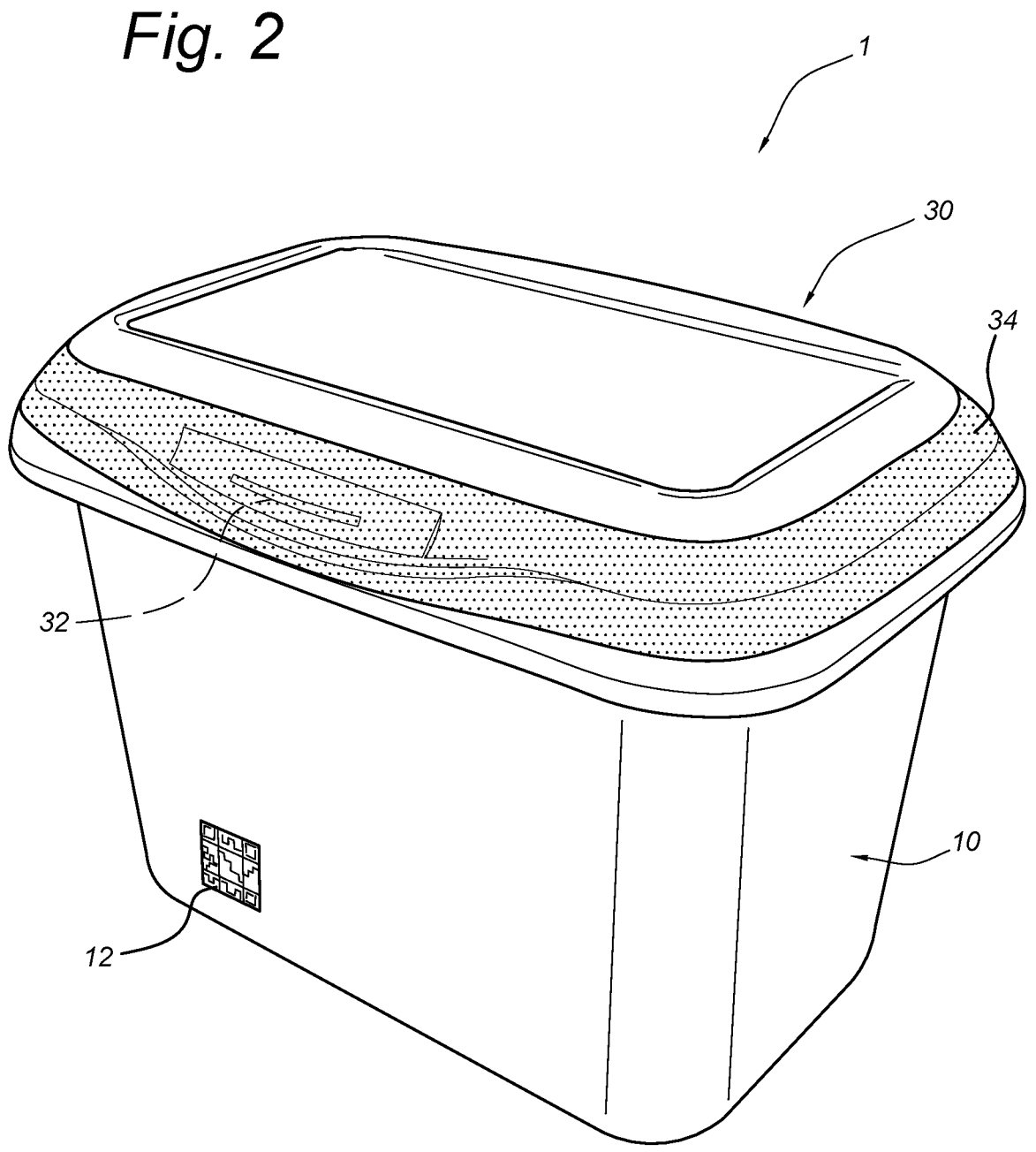
FIG. 2 illustrates a container according to an embodiment of the present invention in a closed position.

FIG. 2 illustrates a container according to the present invention in a closed position. FIG. 2 therefore shows the container body 10 and the cover 30 with the closure means 32. The embodiment of FIG. 2 furthermore comprises tamperproof closure means 34 which as an example has a form of a sleeve that is wrapped around the cover 30 and that does not allow the closure means 32 to be opened without the tamper-proof closure means 34 being broken or altered. Since the tamper-proof closure 34 cannot be put back intact once it has been altered, it allows a consumer to identify whether the product has been opened before purchasing it. In an alternative embodiment, the tamper-proof closure means is a sticker that goes over cover 30 and the underlying frame with which cover 30 connects and forms a closed system before the consumer opens the container for the first time.

When the product is in the store, a consumer may scan the outer scannable code 12 with a suitable code scanner, which can be implemented in a smartphone or tablet, or any other suitable device. The outer scannable code 12 may provide information about the product, and it therefore can be scanned before purchasing the product to obtain information such as the composition, the batch number, the expiration date, and other useful information.

The phrasing that the "outer scannable code is provided on the container" is also meant to include an outer box carrying the outer scannable code (12) which outer box contains the container (1) for infant formula food.

Figure 3:
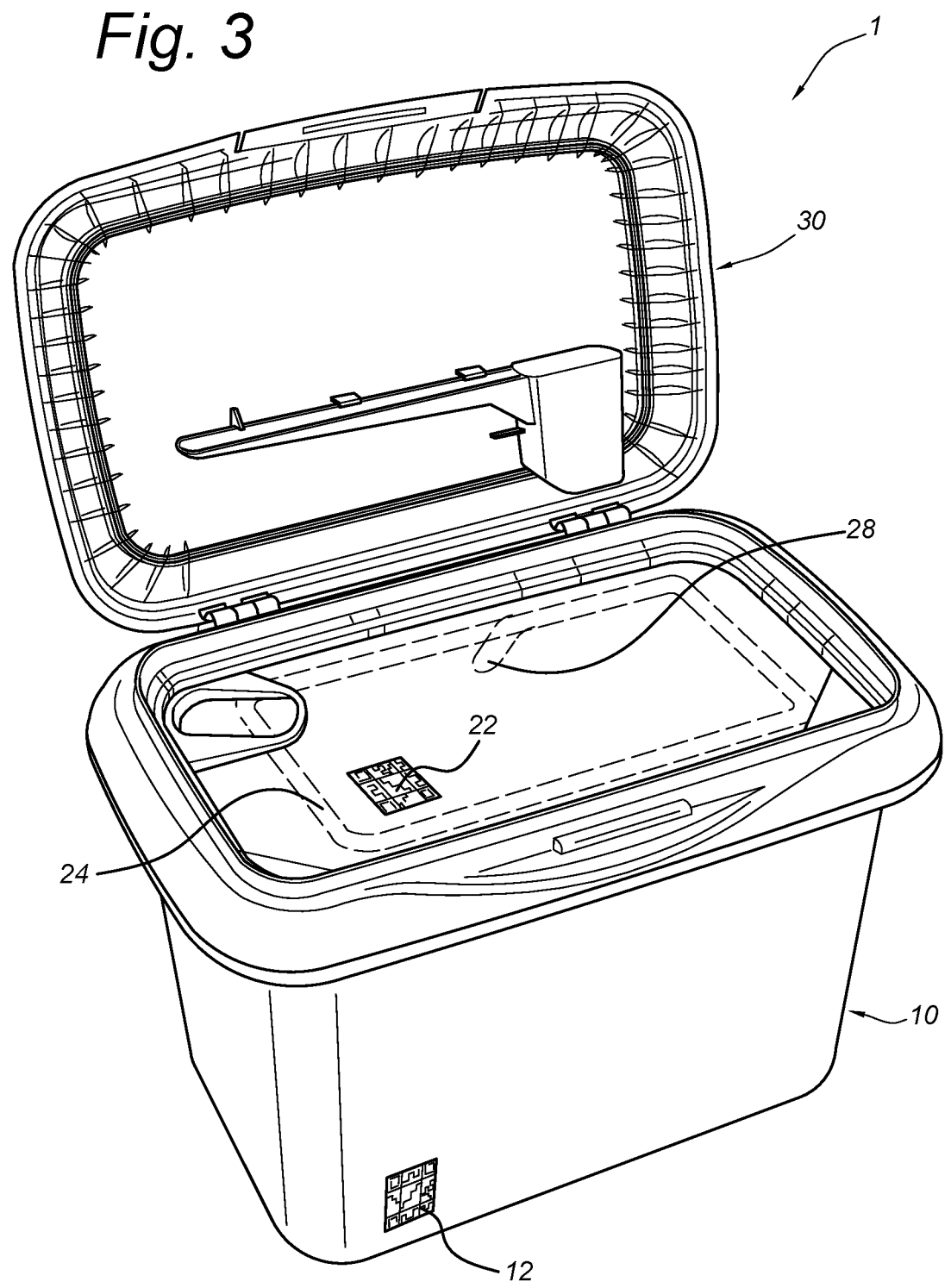
FIG. 3 illustrates a container according to an embodiment of the present invention in a position where the cover is open.

FIG. 3 illustrates a container according to the present invention in a position where the cover 30 is open. The inner scannable code 22 is preferably located in the membrane seal 20, more preferably on the outer part of the membrane seal 20 facing away from the food content.

In the embodiment of FIG. 3 the inner scannable code 22 is placed on the outer part of the membrane seal 20. It can be seen that the inner scannable code 22 may only be scanned once the cover 30 has been opened, and therefore once the tamper-proof closure means 34, if present, has been irreversibly altered.

The inner scannable code 22, when scanned, may be used to obtain information, from e.g. a server connected to the Internet, indicating whether the code has already been scanned or not. The first time the inner scannable code 22 is scanned, the code scanner, which can be running in a smartphone, tablet, or other suitable reader, may send a message including the scanned inner scannable code to a server that stores information about the codes placed in the different products, so that the server can record that the inner code has been scanned once. When the inner scannable code 22 is scanned a second time, and the code reader sends a message including the inner scannable code to the server, the server will recognize that the code has already been scanned before and will send a message back to the code reader with a warning. In this way, if a consumer scans the inner code and a warning is shown, he knows that the inner scannable code 22 has already been scanned once and that the product may therefore not be authentic.

If a counterfeiter would just make up an inner or outer scannable code, the server can reply, to the message including the inner or outer scannable code, that the scanned code does not exist and is therefore invalid.

If a counterfeiter would take two valid codes, one outer scannable code and one inner scannable code from different products and combine them (for example, combining the outer package, including outer scannable code, of a higher-cost product with the inner packaging and content, including the inner scannable code, of a lower-cost product) then, when the user scans the outer and inner scannable codes in succession, the server can indicate that the two scanned codes are not associated and that therefore the combined product is not authentic.

The inner scannable code 22 and the outer scannable code 12 may preferably be laser marked visible codes. This has the advantage that the marks left by laser marking cannot easily be changed since the laser beam removes the top layer. In another embodiment, the inner scannable code 22 and the outer scannable code 12 may be marked using inkjet. In this embodiment, a transparent finishing layer may cover the inkjet marking to protect it from being erased.

The inner scannable code 22 and the outer scannable code 12 may preferably be QR codes, but any other suitable code that is easy to read by a consumer device can also be used. The inner and outer scannable codes may codify a URL (Uniform Resource Locator) including a code value, so that the URL can be used by the scanning device to access a server via the Internet.

Figure 4:
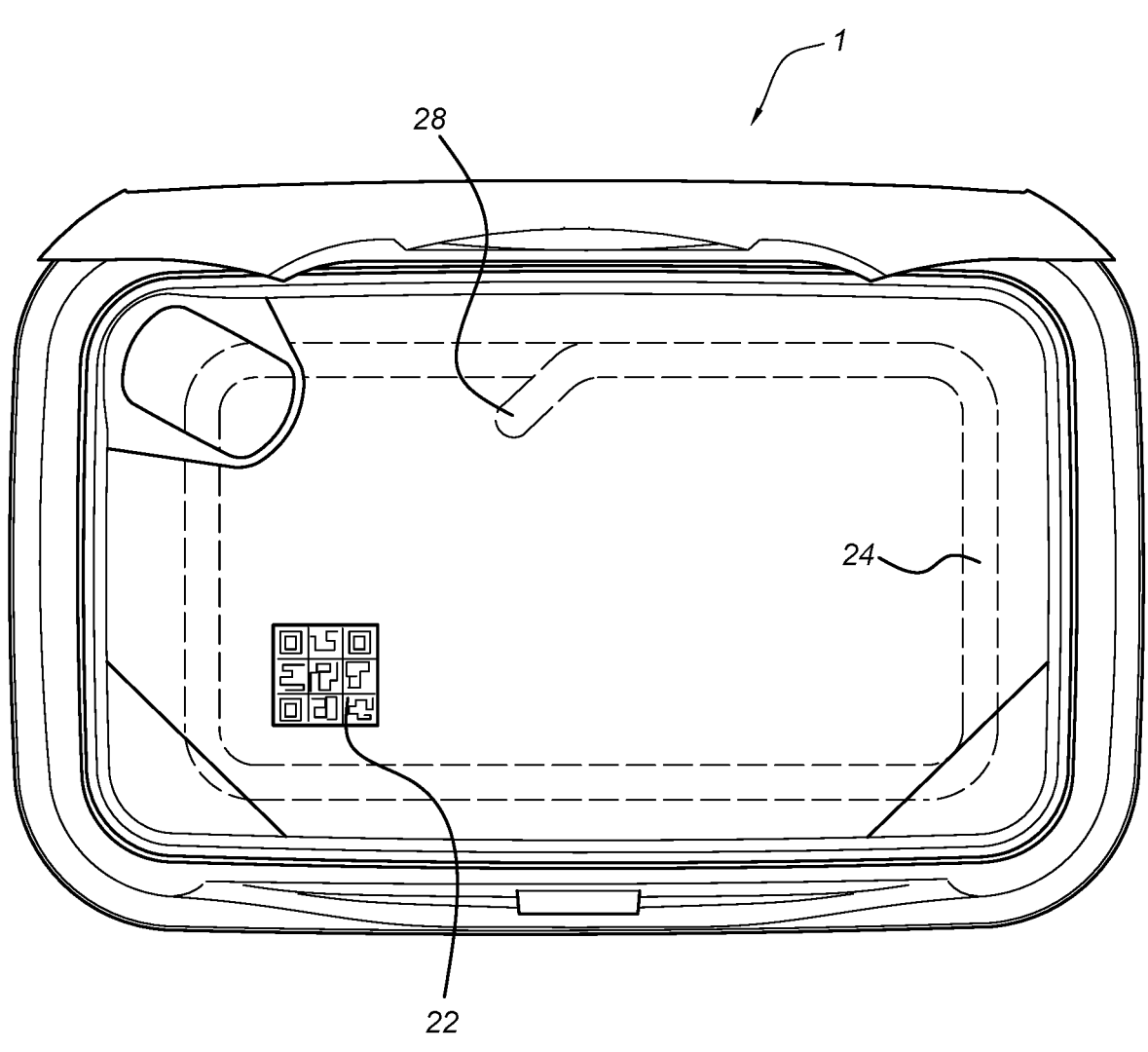
FIG. 4 is a top view of the container according to an embodiment of the invention when the cover is open.

FIG. 4 is a top view of the container according to the invention when the cover is open. As it can be seen, the membrane seal 20 completely covers the space where the product is placed and it therefore seals it and protects it before use. The tear strip 24 can be torn so that the membrane seal 20 can be opened, leaving a part of the membrane seal 20 that is in contact with the container in place, and not removing it. The tear strip may comprise a pull tab 28 configured to be pulled by the consumer and to help the tear strip 24 to be torn.

The membrane seal 20 according to an embodiment of the invention may have a surface area of at least 50 square centimetres, or even at least 100 square centimetres.

The inner scannable code 22 according to the present invention is preferably placed on the membrane seal 20 outside the tear path, in order to avoid that the tear path may cause imperfections in the code that make it not optimally scannable. In an exemplary embodiment, as shown in FIG. 4, the inner scannable code 22 is located on the part of the membrane seal which will be removed when the container is open, that is, on a side of the tear path opposite the side of a container's edge.

Figure 5:
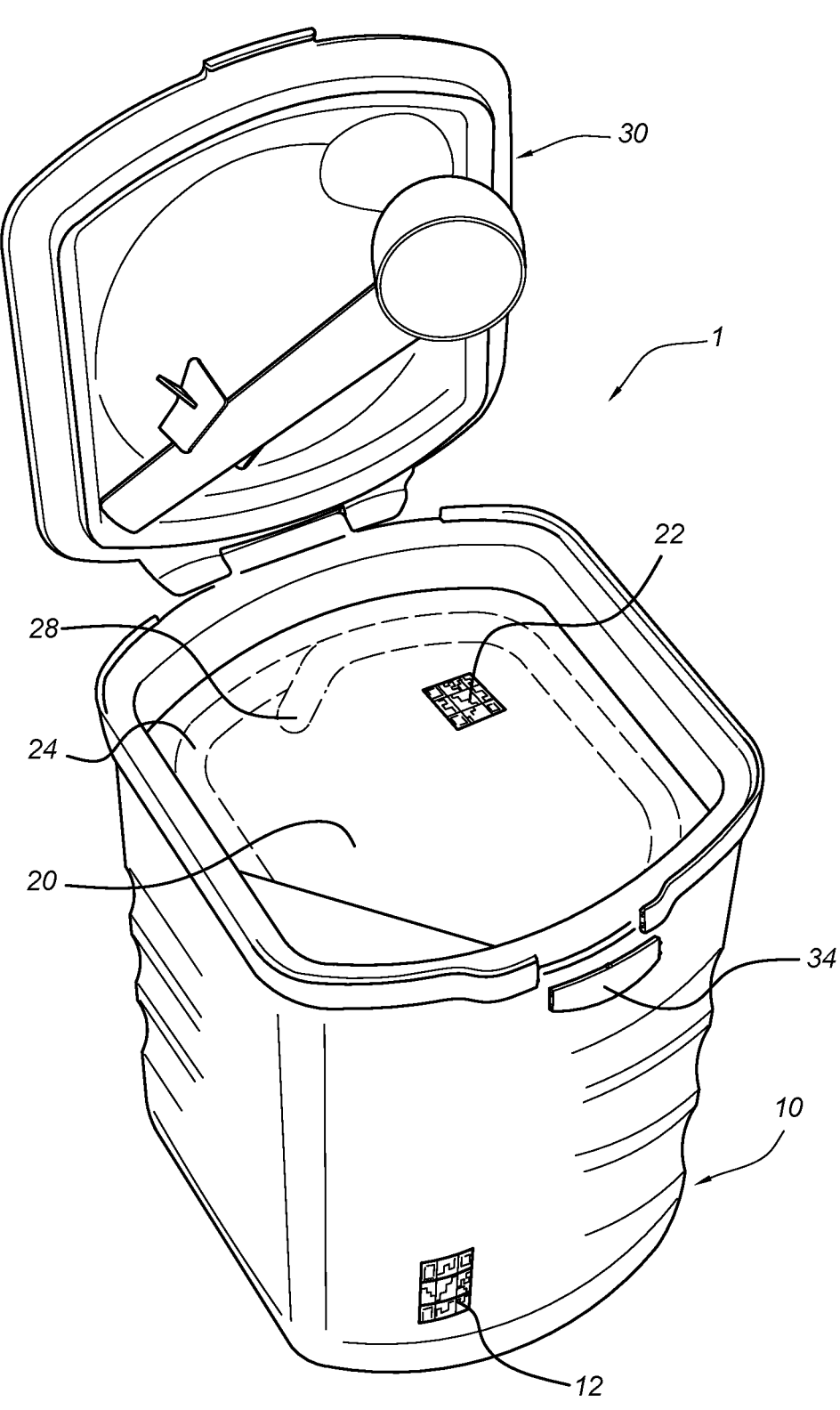
FIG. 5 is a container according to an embodiment of the present invention in a position where the cover is open.
Figure 6:
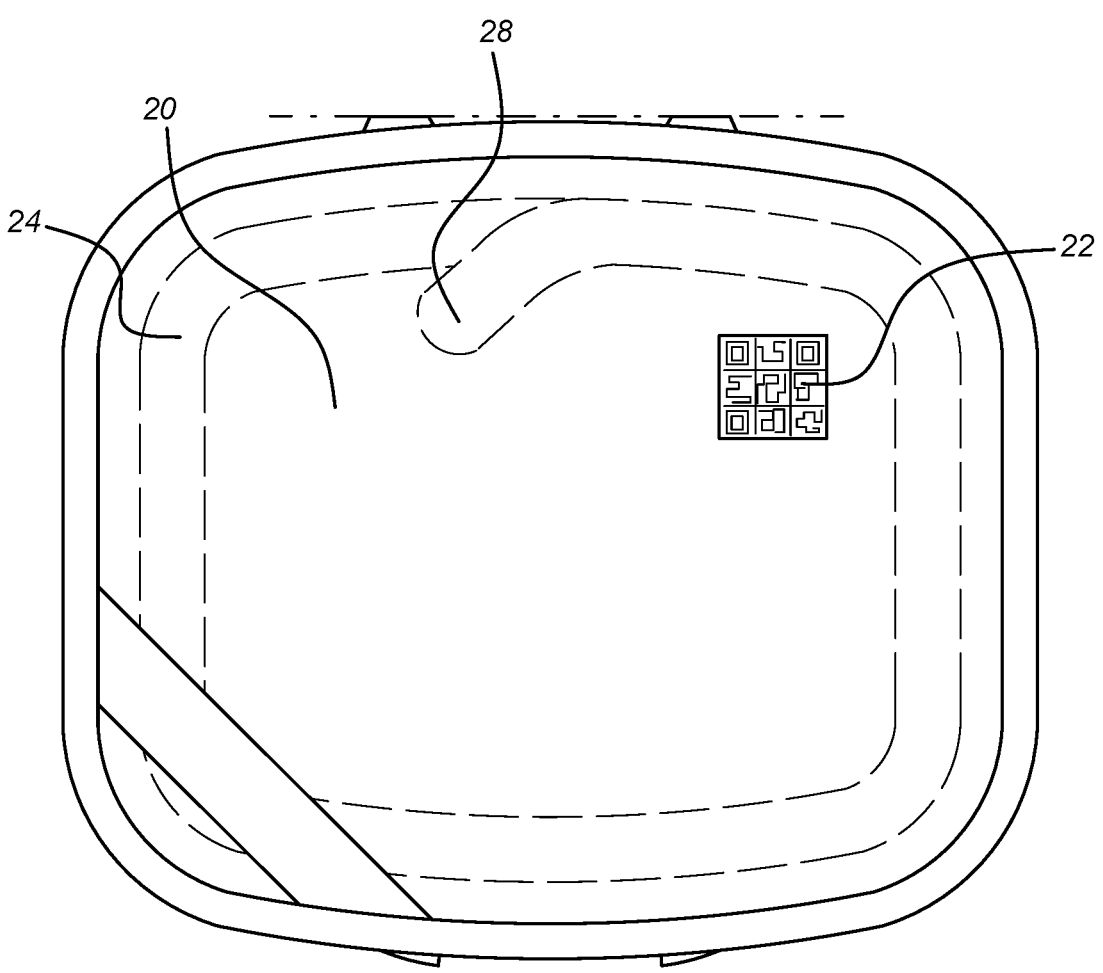
FIG. 6 is a top view of a container according to an embodiment of the invention when the cover is open.

FIG. 5 is a container according to another embodiment of the present invention in a position where the cover is open, and FIG. 6 is a top view of a container according to the invention when the cover is open.

The container represented in FIGS. 5 and 6 has a different shape with respect to the embodiments of FIGS. 1 to 4, but its components are to be interpreted as the same. The outer scannable code 12 may be placed on the outer surface of the container body 10, on the outer surface of the cover 30, or on the outer surface of an outer box containing the container, and the inner scannable code 22 may be placed on the membrane seal 20 so that it can only be scanned when the cover 30 is opened.

In the embodiment of FIG. 5, the container may comprise tamper-proof closure means 34 also acting as closure means 32. In this embodiment, the first time the cover 30 is to be opened, the tamper-proof closure means 34 need to only partially be broken or torn, and from that moment, the tampering is evident and it is then configured to act as the closure means that allow the cover 30 to be closed and opened normally.

FIG. 6 shows that the shape of the container is different from the one in the first embodiment and therefore the size of the membrane seal 20 is also different, but it is always adapted to the shape of the container in order to seal and protect the product inside the container prior to use.

In an embodiment, the container according to the present invention has a container body 10 which is a circular metal can comprising an outer scannable code 12, a membrane seal 20, an inner scannable code 22, preferably positioned on the gas-tight membrane seal facing away from the infant formula content inside the container body, a pull-tab 28 to grab the membrane seal for easy removal thereof, a closure means 32 and preferably a tamper-proof closure means 34, most preferably in the form of a sticker that goes over cover 30 and the underlying frame with which cover 30 connects and forms a closed system before the consumer opens the container for the first time (all not shown). In this embodiment, the infant food container contains a peel-off seal which is a type of seal that is widely used in the infant formula industry that does not leave behind a part of the seal once it has been removed. In other words, such a seal type is fully removed from the container mouth which gives entry to the food contained in the container body 10. Such a gas-tight peel-off seal 20 does not leave a part of the membrane seal in the container.

The anti-counterfeit container of the present invention thus provides a layered authentication mechanism by which safety in the products is increased and a bigger hurdle for counterfeiters is posed. The outer and inner scannable codes 12 and 22 allow for a secure authentication, but the specific places where these codes are located in the container make it more robust: the outer scannable code 12 may be scanned without the container being opened, but the inner scannable code 22, which is associated with the outer scannable code, can only be scanned when the cover 30 is opened and, if the container comprises tamper-proof closure means 34, when the tamper-proof closure means 34 is visibly and irreversibly broken or opened.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

LIST OF REFERENCE SYMBOLS

1 Container
10 Container body
12 Outer scannable code
20 Membrane seal
22 Inner scannable code
24 Tear strip
26 Tear path
28 Pull tab
30 Cover
32 Closure means
34 Tamper-proof closure means
The invention claimed is:
1. A container for infant formula food, comprising:
(a) a cover for closing the container;
(b) an outer scannable code provided on the container so as to be scannable from the outside;
(c) a gas-tight membrane seal inside the container for sealing a food content of the container prior to use, wherein the gas-tight membrane is attached to the container by an attachment mechanism (d) an inner scannable code provided on the gas-tight membrane seal so as to be only scannable after opening the container; and
(e) a layered authentication mechanism comprising the outer scannable code and the inner scannable code, wherein the outer scannable code has a relationship with the inner scannable code.

2. The container according to claim 1, wherein the gas-tight membrane seal comprises a tear strip configured to be torn along a tear path and to leave a part of the membrane seal in the container.

3. The container according to claim 1, wherein the gas-tight membrane seal comprises a plastic, metal or plastics-metal foil.

4. The container according to claim 1, wherein the cover comprises a tamper-proof closure for closing the container which cannot be opened without permanently breaking a part of the closure.

5. The container according to claim 1, wherein the gas-tight membrane seal has a surface area of at least 50 square centimetres.

6. The container according to claim 5, wherein the gas-tight membrane seal has a surface area of at least 100 square centimetres.

7. The container according to claim 1, wherein the inner scannable code is located on the outer side of the membrane seal facing away from the container content.

8. The container according to claim 2, wherein the inner scannable code is placed on the gas-tight membrane seal outside of the tear path.

9. The container according to claim 8, wherein the inner scannable code is placed on the gas-tight membrane seal on a side of the tear path opposite a container edge.

10. The container according to claim 1, wherein the inner scannable code is a laser marked visible code on the gas-tight membrane seal.

11. The container according to claim 1, wherein the outer scannable code is a laser marked visible code on the outer surface of the container.

12. The container according to claim 1, wherein the relationship between the inner scannable code and the outer scannable code is a one-to-one relationship.

13. The container according to claim 1, wherein the inner scannable code and/or the outer scannable code is a QR code.

14. The container according to claim 1, wherein the outer scannable code is scannable without breaking part of a tamper-proof closure means, wherein the tamper-proof closure means is adapted to break upon opening the cover.

15. The container according to claim 1, wherein the relationship between the inner scannable code and the outer scannable code is a one-to-many relationship.

* * * * *